No. 779,325. PATENTED JAN. 3, 1905.
M. S. SOBER.
CHOPPER.
APPLICATION FILED JULY 14, 1904.
4 SHEETS—SHEET 2.
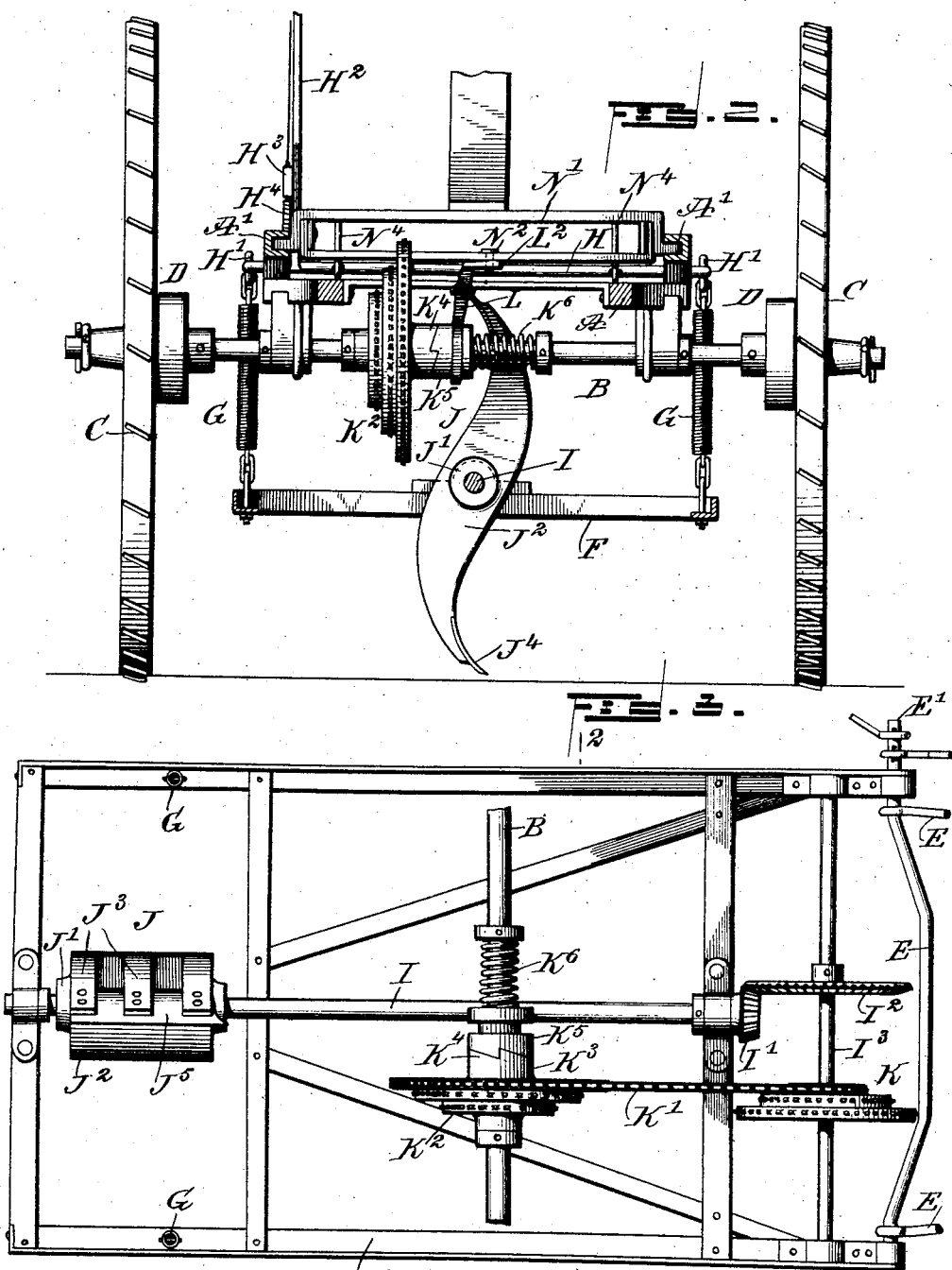
WITNESSES:
INVENTOR
Morris Smith Sober
BY
ATTORNEYS

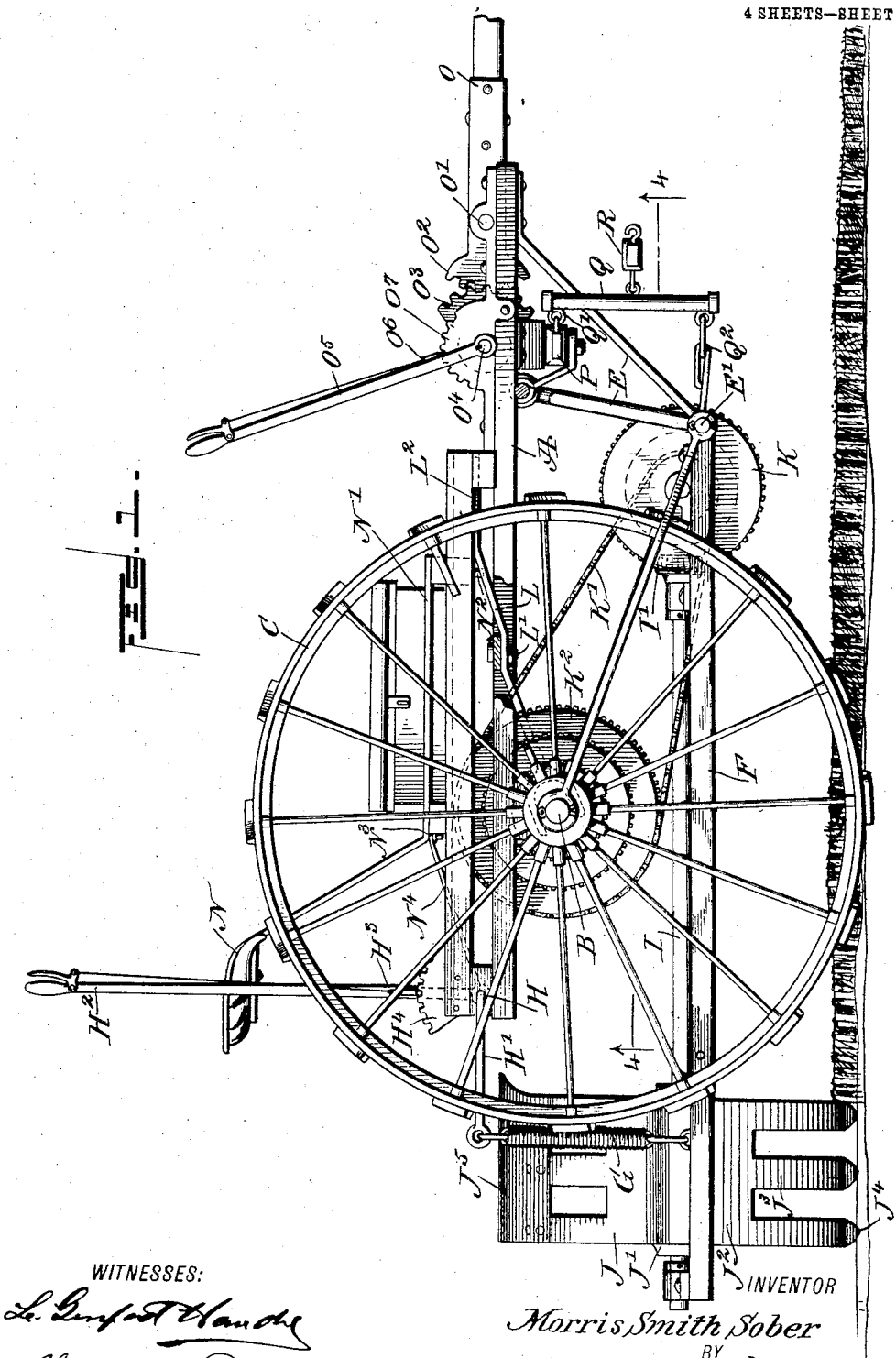

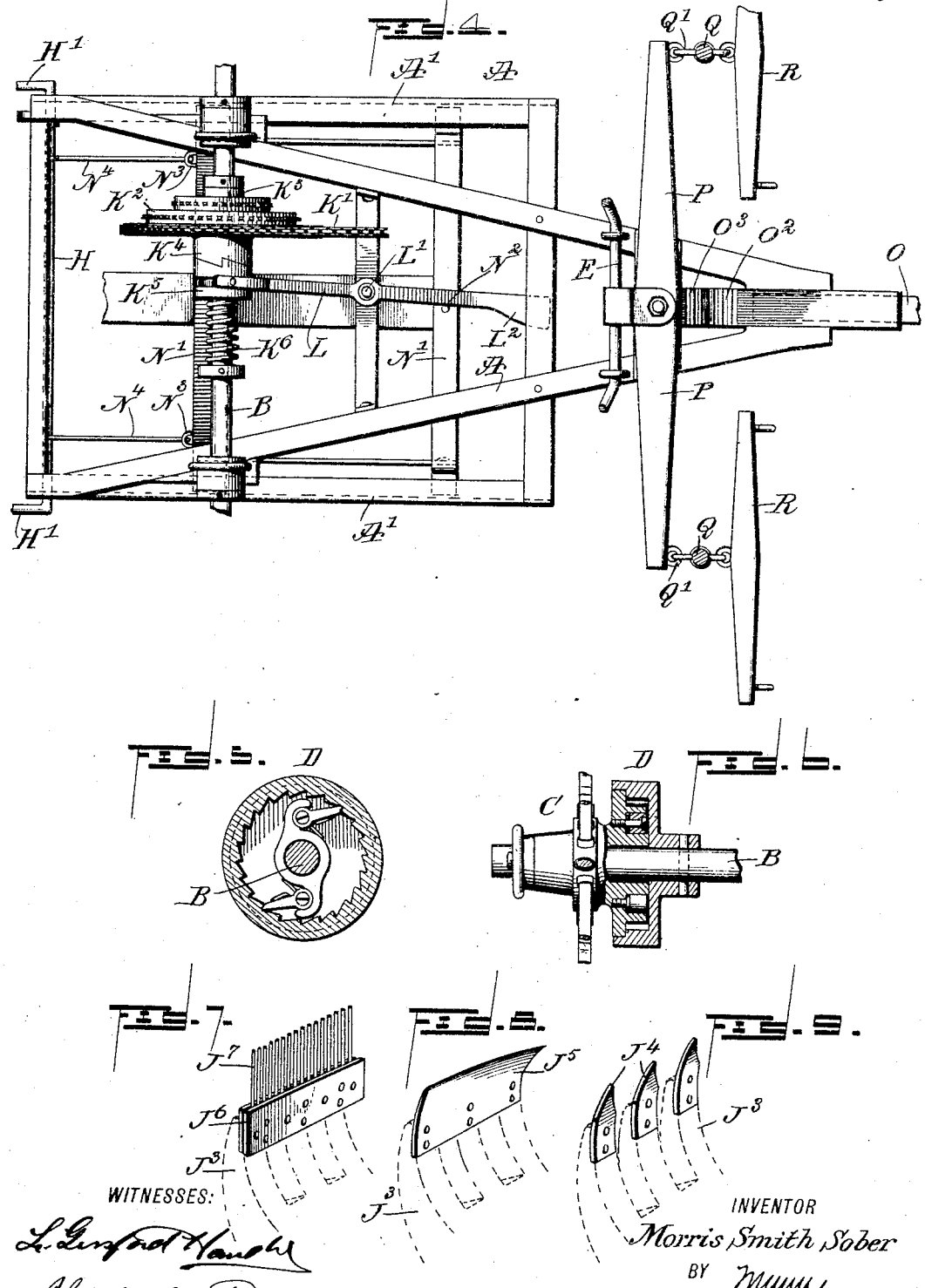

No. 779,325. PATENTED JAN. 3, 1905.
M. S. SOBER.
CHOPPER.
APPLICATION FILED JULY 14, 1904.
4 SHEETS—SHEET 4.
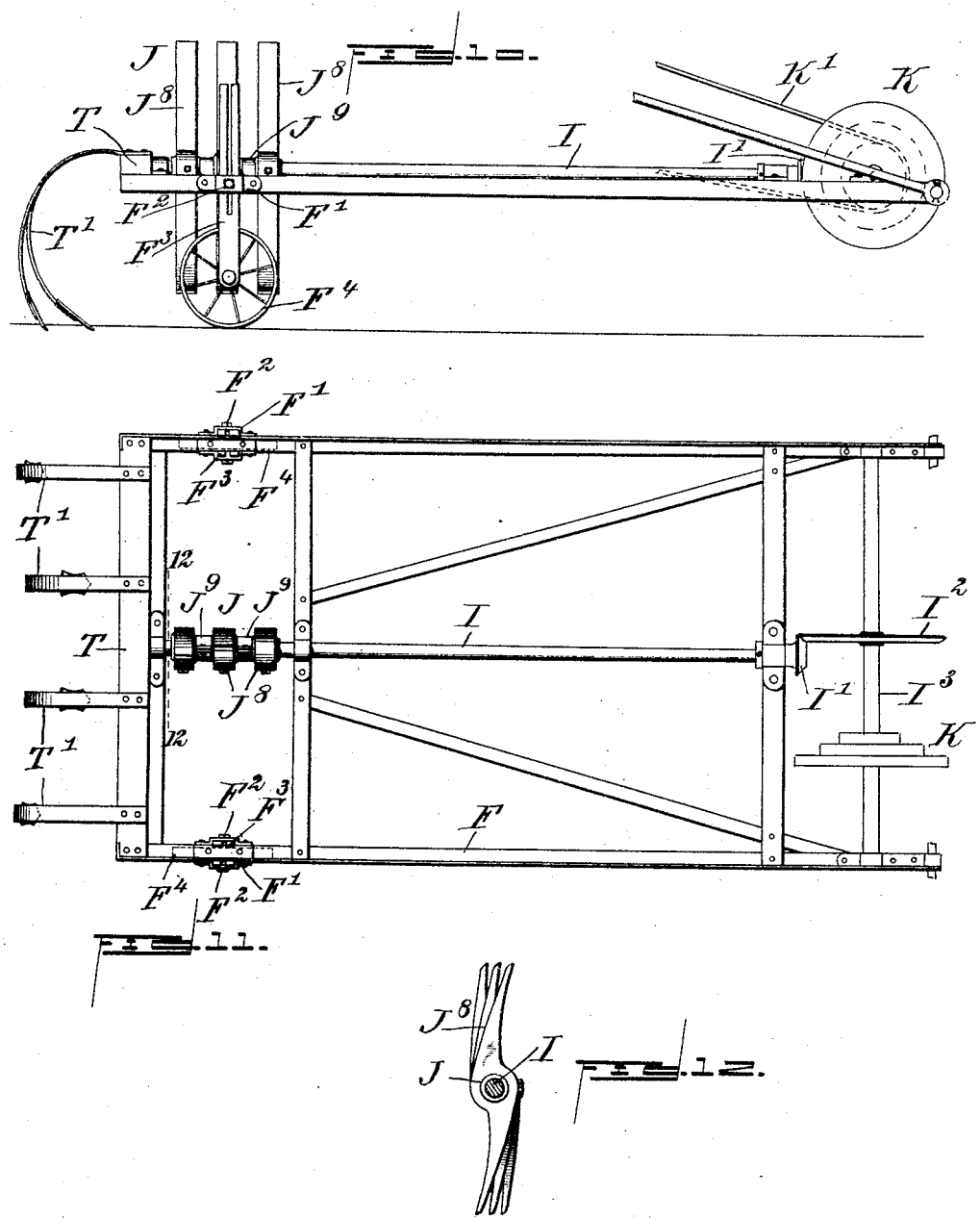
WITNESSES:
INVENTOR
Morris Smith Sober
BY
ATTORNEYS No. 779,325.

Patented January 3, 1905.

UNITED STATES PATENT OFFICE.

MORRIS SMITH SOBER, OF McLOUD, OKLAHOMA TERRITORY, ASSIGNOR OF ONE-THIRD TO JOSEPH A. SOBER, OF SUNBURY, PENNSYLVANIA.

CHOPPER.

SPECIFICATION forming part of Letters Patent No. 779,325, dated January 3, 1905.

Application filed July 14, 1904. Serial No. 216,503.

*To all whom it may concern:*

Be it known that I, MORRIS SMITH SOBER, a citizen of the United States, and a resident of McLoud, in the county of Pottawatomie and Territory of Oklahoma, have invented a new and Improved Chopper, of which the following is a full, clear, and exact description.

The invention relates to agricultural machines; and its object is to provide a new and improved chopper more especially designed for use in cotton-fields, but also useful in corn-fields, rice cultivation, and the like and arranged to permit convenient chopping, cultivating, and thinning of rows in the fields and whipping caterpillars and other insects from the plants without injury to the latter.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement, parts being broken out. Fig. 2 is a transverse section of the same on the line 2 2 of Fig. 3. Fig. 3 is a plan view of the auxiliary frame, the cutter, and the gearing for driving the cutter from the axle of the vehicle. Fig. 4 is an inverted sectional plan view of the improvement on the line 4 4 of Fig. 1. Fig. 5 is a sectional side elevation of the ratchet mechanism for connecting the drive-wheels with the axle. Fig. 6 is a transverse section of the same. Figs. 7, 8, and 9 are perspective views of the several tools or cutters employed on the revolving cutter or chopper. Fig. 10 is a side elevation of the improvement arranged as a cultivator. Fig. 11 is a plan view of the same. Fig. 12 is a cross-section of the same on the line 12 12 of Fig. 11, showing the relative position of the cutters on the shaft; and Fig. 13 is a perspective view of one of the sectional collars for spacing the cutters.

On the frame or body A of a two-wheeled vehicle is journaled the axle B, carrying the drive-wheels C, connected at their hubs by pawl-and-ratchet mechanisms D (see Figs. 5 and 6) with the said axle B, so that on the forward motion of the vehicle the wheels rotate the axle. On backing the vehicle the axle remains at a standstill, and on turning the vehicle one wheel remains inactive while the other turns the axle.

From the forward end of the frame A depends a hanger E, carrying transverse pivots E', on which is mounted to swing up and down an auxiliary frame F, extending between the ground and the frame A and connected near its rear end with coil-springs G, hung on arms H', forming part of a transverse rock-shaft H, journaled in suitable bearings carried on the rear end of the frame A. On the rock-shaft H is secured a handle $H^2$ under the control of the operator for rocking the said shaft H to swing the auxiliary frame F and the parts carried thereby up or down, as occasion may require and as hereinafter more fully explained. The handle $H^2$ is provided with a locking-pawl $H^3$, adapted to engage a notched segment $H^4$, attached to the frame A to normally hold the shaft H in a locked position and the auxiliary frame F in a horizontal position, as plainly indicated in Fig. 1.

On the auxiliary frame F is journaled a longitudinally-extending shaft I, carrying at its rear end a chopper, cutter, or switch J, adapted to rotate in a transverse direction—that is, at a right angle to the forward movement of the wheeled vehicle. This chopper, cutter, or switch J, as shown in Figs. 1, 2, and 3, consists of a hub J', secured on the rear end of the shaft I, and from the said hub J' extends in an opposite direction the body $J^2$, S-shaped in cross-section and terminating at its ends in prongs $J^3$ for carrying cutting-blades $J^4$ or $J^5$, or, as shown in Fig. 1, the blades $J^4$ at one end and a single blade $J^5$ at the other end. As indicated in Fig. 7, a transverse bar $J^6$ may be secured to each set of prongs $J^3$, and on the said bar $J^6$ are secured spaced whipping-switches $J^7$, of willow or other flexible material, serving for whipping the plants whenever it is desired to brush or whip caterpillars or like insects off said plants without injury to the latter. The blade $J^5$ is used for making a wide cut in the row, especially when the ground is comparatively soft; but if the ground is formed with a hard crust then I prefer to use the single blades $J^4$, as indicated in the lower portion of Fig. 1 and in Fig. 9. As illustrated in Figs. 10, 11, and 12, the chopper, cutter, or switch J is made of a plurality of separate cutters $J^8$, secured to the shaft I and set at angles one to the other to successively engage the row to do the chopping or cutting. The cutters $J^8$ are held spaced apart by sectional collars $J^9$.

The shaft I and the cutter J are rotated from the axle B, and for this purpose the following arrangement is made: On the forward end of the shaft I is secured a bevel gear-wheel $I'$, (see Figs. 1 and 3,) in mesh with a bevel gear-wheel $I^2$, secured on a transversely-extending shaft $I^3$, journaled in suitable bearings, held on the forward end of the auxiliary frame F. On the shaft $I^3$ is secured a stepped sprocket-wheel K, one of the steps of which is connected at a time by a sprocket-chain $K'$ with one of the steps of a stepped sprocket-wheel $K^2$, having its hub $K^3$ mounted to rotate loosely on the axle B. The hub $K^3$ is formed with a clutch member $K^4$, adapted to be engaged by a clutch member $K^5$, mounted to slide on and to rotate with the axle B, the clutch member $K^5$ being normally held in engagement with the clutch member $K^4$ by a spring $K^6$, as shown in Figs. 2, 3, and 4. Now when the clutch member $K^5$ is in mesh with the clutch member $K^4$ and the vehicle is drawn forward then the drive-wheels C impart a turning motion to the axle B by the pawl-and-ratchet mechanisms D, and the rotary motion of the axle B is transmitted by the clutch members $K^5$ $K^4$ to the hub $K^3$, and consequently to the sprocket-wheels $K^2$, which in turn rotates the shaft $I^3$ by the sprocket-chain $K'$ and the sprocket-wheel K. The rotary motion of the shaft $I^3$ is transmitted to the shaft I by the bevel gear-wheel $I^2$ and pinion $I'$, so that the cutter is rotated in a transverse direction at the time the wheeled vehicle is drawn forward over the ground and in such a manner that the two drive-wheels straddle the ground for the cutter or chopper to cut the row in a transverse direction.

The clutch member $K^5$ can be thrown and held out of gear by a shifting-lever L, controlled by the seat-frame $N'$ of a seat N for the driver, the said seat-frame $N'$ being for the purpose mentioned mounted to slide longitudinally in suitable guideways $A'$, formed on or secured to the frame A. The shifting-lever L is fulcrumed at $L'$ on the main frame A, and its forward end is formed with a cam-face $L^2$, adapted to be engaged by a pin $N^2$, secured on the seat-frame $N'$, so that when the seat-frame $N'$ is moved forward in its guideways $A'$ the pin acts on the cam-face $L^2$ to impart a swinging motion to the shifting-lever L for the latter to move the clutch member $K^5$ out of mesh with the clutch member $K^4$ to stop rotation of the cutter J by the gearing above described. Normally the seat-frame $N'$ is held locked in the rearmost position, (shown in Figs. 1 and 4,) and for this purpose the seat-frame $N'$ is provided at its rear end with eyes $N^3$, adapted to be engaged by hooks $N^4$, held loosely on the rocking shaft H. Now when it is desired to stop the rotation of the cutter J from the axle B the hooks $N^4$ are disconnected from the eyes $N^3$ and the seat-frame $N'$ is slid forwardly to cause the pin $N^2$ to act on the cam-face $L^2$ for the shifting-lever L to throw the clutch member $K^5$ out of gear with the clutch member $K^4$.

The pole O of the two-wheeled vehicle is fulcrumed at $O'$ on the front end of the frame A, and on the heel of the said pole O is arranged a segmental gear-wheel $O^2$, in mesh with a segmental gear-wheel $O^3$, fastened on a transversely-extending rock-shaft $O^4$, journaled in suitable bearings on the frame A. A handle $O^5$ is secured on the shaft $O^4$ and is within convenient reach of the operator for imparting a rocking motion to the shaft $O^4$ to cause the segmental gear-wheel $O^3$ to act on the segmental gear-wheel $O^2$ to swing the pole O up or down, according to the direction in which the handle $O^5$ is moved.

By the arrangement described the frame A can be tilted more or less, so as to bring the cutter J at the rear end of the vehicle deeper into the ground or farther out of the same, according to the nature of the work in hand.

A locking-pawl $O^6$, held on the handle $O^5$, is adapted to engage a notched segment $O^7$ on the frame A to lock the shaft $O^4$, and consequently the segmental gear-wheels $O^3$ and $O^2$ and the pole O, in position after the desired adjustment is made.

A doubletree P is fulcrumed at the forward end of the frame A and is connected at its ends by short links $Q'$ with the upper ends of vertically-disposed bars Q, connected by links $Q^2$ with the lower end of the hanger E. The bars Q carry at or near their middle swingletrees R for receiving the traces of the team employed to draw the wheeled vehicle over the field.

When the machine is in use, the drive-wheels C travel on opposite sides of the row of cotton, corn, or the like, so that the shaft I is in vertical alinement with the row and when rotated causes the chopper or cutter J to cut the row in a transverse direction to chop or block out to a stand. According to the nature of the ground different tools are used on the cutter J, as previously mentioned, and if it is desired to whip caterpillars or other insects from off young plants then the cutters are replaced by the whip-rods $J^7$, which have a tendency to whip the young plants, so as to comb off any caterpillars or like insects on the young plants.

In order to permit of using the machine as a cultivator or like machine at the same time use is made of the chopper, cutter, or switch J, the following device is provided, special reference being had to Figs. 10 and 11.

On the side beams of the auxiliary frame F are secured the bearings F', in which are adjustably secured by set-screws $F^2$ the arms $F^3$, in which are journaled the small wheels $F^4$, traveling on the ground on opposite sides of a row of plants. On the rear end of the auxiliary frame F is removably secured a cross-beam T, carrying a plurality of cultivating-plows T', preferably two for each strip of ground between adjacent rows of plants. Now when the machine is drawn forward the spaced cutters $J^8$ thin out the young plants in the row, and at the same time the ground between the rows of plants is thoroughly cultivated by removal of weeds and loosening of the ground.

Having thus described my invention, I claim as new and desire to secure by Letters Patent—

1. A machine of the class described, comprising a main frame, an auxiliary frame, a cutter supported by the latter to revolve in a direction at right angles to the line of travel of the machine, a slidable frame on the main frame, means for driving the cutter from the axle of the machine, and means controlled by said slidable frame for throwing said driving means into and out of operation.

2. A machine of the class described, comprising a main frame, an auxiliary frame, a cutter supported by the latter to revolve in a direction at right angles to the line of travel of the machine, a forwardly-slidable seat on the main frame, a gearing for driving the cutter from the axle of the machine, means normally retaining the seat in rearward position, and mechanism controlled by the movements of the seat for throwing the gearing into and out of engagement.

3. A machine of the class described, comprising a wheeled vehicle having a main frame, an auxiliary frame pivoted at its forward end to said main frame, and adjustably supported therefrom at its rear end, a cutter supported by the main frame to revolve in a direction at right angles to the line of travel of the machine, a slidable seat-frame on the main frame, a gearing for driving the cutter from the axle of the vehicle, and a clutch mechanism controlled by said seat-frame, for throwing said gearing into and out of engagement, said mechanism including a lever fulcrumed on the main frame, and having a cam-face coöperating with a pin on the seat-frame.

4. A machine of the class described, comprising a wheeled vehicle having longitudinal guideways, a revoluble cutter on the vehicle and rotating in a direction at a right angle to the movement of the vehicle, the cutter being arranged in the rear portion of the vehicle, a seat slidable on the said guideways for shifting the seat and the operator, a gearing for driving the said cutter from the axle of the vehicle, and a clutch mechanism controlled by the said seat for throwing the said gearing in or out of gear.

In testimony whereof I have signed my name to this specification in the presence of two subscribing witnesses.

MORRIS SMITH SOBER.

Witnesses:
 W. L. RUSSELL,
 L. BOST.